United States Patent
Eckhardt (10) Patent No.: US 8,354,626 B2
(45) Date of Patent: Jan. 15, 2013

(54) OPTICAL SYSTEM FOR A MISSILE, AND METHOD FOR IMAGING AN OBJECT

(75) Inventor: Reiner Eckhardt, Überlingen (DE)

(73) Assignee: Diehl BGT Defence GmbH & Co. KG, Ueberlingen (DE)

( * ) Notice: Subject to any disclaimer, the term of this patent is extended or adjusted under 35 U.S.C. 154(b) by 387 days.

(21) Appl. No.: 12/821,635

(22) Filed: Jun. 23, 2010

(65) Prior Publication Data

US 2010/0327105 A1 Dec. 30, 2010

(30) Foreign Application Priority Data

Jun. 23, 2009 (DE) .......................... 10 2009 029 895

(51) Int. Cl.
*F41G 7/20* (2006.01)
*F41G 7/00* (2006.01)
(52) U.S. Cl. .................. 244/3.16; 244/3.1; 244/3.15
(58) Field of Classification Search ............. 244/3.1–3.3
See application file for complete search history.

(56) References Cited

U.S. PATENT DOCUMENTS

| | | | | |
|---|---|---|---|---|
| 3,807,659 A * | 4/1974 | Winfrey | ...................... | 244/3.16 |
| 3,837,733 A * | 9/1974 | Shoch et al. | ................... | 244/3.17 |
| 4,091,412 A * | 5/1978 | Salonimer | .................... | 244/3.16 |
| 4,112,294 A * | 9/1978 | Pressiat | ........................ | 244/3.16 |
| 4,131,248 A * | 12/1978 | Berglund | ..................... | 244/3.16 |
| 4,314,761 A * | 2/1982 | Reymond et al. | ............ | 244/3.16 |
| 4,386,848 A * | 6/1983 | Clendenin et al. | ........... | 244/3.16 |
| 4,784,350 A * | 11/1988 | Darden | .......................... | 244/3.1 |
| 4,917,330 A | 4/1990 | Dulat et al. | | |
| 5,080,301 A * | 1/1992 | Knoche et al. | ................ | 244/3.1 |
| 5,138,162 A * | 8/1992 | Hacskaylo | .................... | 244/3.16 |
| 5,323,987 A * | 6/1994 | Pinson | ......................... | 244/3.16 |
| 5,529,261 A | 6/1996 | Iddan | | |
| 6,267,039 B1 * | 7/2001 | Czarnecki | .................... | 244/3.16 |

(Continued)

FOREIGN PATENT DOCUMENTS

DE 3616796 C1 7/1987

(Continued)

OTHER PUBLICATIONS

Hecht, Eugene, "Optics", 1974, pp. 157-160, Addison-Wesley Publishing Company Inc., ISBN: 3-925118-86-1.

*Primary Examiner* — Bernarr Gregory
(74) *Attorney, Agent, or Firm* — Laurence A. Greenberg; Werner H. Stemer; Ralph E. Locher (57) ABSTRACT

An optical system for a missile has optics for imaging an object through a beam path on an imaging plane. The optics have external optics, rotatably mounted about a roll axis and a pitch axis of the missile, and internal optics, and one of the ends of the beam paths is fixed with respect to the structure in the missile. In order to prevent image disturbances caused by shadows which are caused at a high squint angle by an element which is fixed to the structure, the optical system includes a shutter, which can be introduced into the beam path during flight of the missile, in order to mask out a shadow, which is produced by an element of the missile, in the beam path in a viewing direction of the external optics which is tilted with respect to the roll axis.

14 Claims, 4 Drawing Sheets

U.S. PATENT DOCUMENTS

| | | | |
|---|---|---|---|
| 6,779,753 B2 | 8/2004 | Baumann et al. | |
| 7,564,478 B2 | 7/2009 | Baumann et al. | |
| 2001/0013565 A1* | 8/2001 | Davidovitch | 244/3.16 |

FOREIGN PATENT DOCUMENTS

| | | | | |
|---|---|---|---|---|
| DE | 10 2007 019 101 A1 | 10/2008 | | |
| DE | 10 2007 030 880 A1 | 1/2009 | | |
| DE | 10 2007 053 730 A1 | 5/2009 | | |
| EP | 0 331 804 A2 | 9/1989 | | |
| EP | 1308748 A1 | 5/2003 | | |
| EP | 1 389 737 A1 | 2/2004 | | |
| EP | 1586195 A1 | 10/2005 | | |
| GB | 2191056 A | 12/1987 | | |
| GB | 2 284 465 A | 6/1995 | | |
| JP | 3-274395 A | * 12/1991 | | 244/3.16 |
| WO | 2004066614 A1 | 8/2004 | | |
| WO | 2004/088237 A1 | 10/2004 | | |

* cited by examiner

OPTICAL SYSTEM FOR A MISSILE, AND METHOD FOR IMAGING AN OBJECT

CROSS-REFERENCE TO RELATED APPLICATION

This application claims the priority, under 35 U.S.C. §119, of German patent application DE 10 2009 029 895.9, filed Jun. 23, 2009; the prior application is herewith incorporated by reference in its entirety.

BACKGROUND OF THE INVENTION

Field of the Invention

The invention relates to an optical system for a missile having optics for imaging an object by way of a beam path on an imaging plane. The optics have external optics, which are mounted such that they can rotate about a roll axis and a pitch axis of the missile, and internal optics. One of the ends of the beam path is fixed with respect to the structure in the missile.

The invention also relates to a method for imaging an object by way of a beam path of the optics of a missile on an imaging plane, wherein the optics have external optics, which are mounted such that they can rotate about a roll axis and a pitch axis of the missile, and internal optics, and one of the ends of the beam path is structurally fixed with respect to the missile.

The size of the inlet aperture of optics is of major importance in order to achieve high resolution of an image of an object or high sensitivity for very weak radiation. For optical tracking of an object which is imaged with high resolution and is movable with respect to the optics, the inlet aperture—or moving external optics—is or are normally slaved to the moving object, such that the inlet aperture moves relative to a structure to which the optics are fitted. During operational use of a missile, for example, the inlet aperture must be capable of being aligned with the object being tracked over as wide a squint angle range as possible with respect to the longitudinal axis of the missile.

At high squint angles, the inlet aperture is, however, limited by the opening angle of a viewing window of the optics. The viewing window is normally formed of a generally spherical, optically transparent nose cover, also referred to as a dome. If the inlet aperture remains actively fixed to the object being aimed at, then aerodynamic or control-dependent rotation oscillations of the missile about its lateral axes lead to a corresponding change in the inlet aperture when shadowing occurs. The changes in the inlet aperture lead to brightness fluctuations and to other disturbances in the recorded image of the object. The same effect results when the squint angle for a target search is actively changed in the event of the inlet aperture being shadowed by an element of the missile which limits the view. This also applies to the opposite variant, in which the optical system is used as part of an emitter.

In theory, the disturbing effect can be determined by calculation by accurate measurement of the squint angle movement, and can be compensated for using a well-known system. If the radiation scenario in the inlet aperture is highly dynamic, for example as a result of background radiation, immission radiation of the aerodynamically heated dome and of the internal structure of the missile, by variable target radiation or countermeasures, such compensation becomes inaccurate and can even lead to undesirable disturbances, for example aliasing effects.

SUMMARY OF THE INVENTION

It is accordingly an object of the invention to provide an optical system for a missile which overcomes the above-mentioned disadvantages of the heretofore-known devices and methods of this general type and which provides for a missile with an optical system which makes it possible to avoid image disturbance caused by shadowing effects, even at high squint angles.

With the foregoing and other objects in view there is provided, in accordance with the invention, an optical system for a missile, comprising:

optics for imaging an object along a beam path onto an imaging plane;

the optics including external optics rotatably mounted about a roll axis and a pitch axis of the missile, and internal optics, and wherein one end of the beam path is structurally fixed with respect to the missile;

a shutter disposed for introduction into the beam path during a flight of the missile, in order to mask out a shadow, which is produced by an element of the missile in the beam path when a viewing direction of the external optics is tilted with respect to the roll axis of the missile.

In other words, the objects are achieved by an optical system of the type mentioned initially which, according to the invention, has a shutter that can be introduced into the beam path during the flight of the missile, in order to mask out a shadow, which is produced by an element of the missile, in the beam path in a viewing direction of the external optics which is tilted with respect to the roll axis. Although the shutter reduces the overall intensity of the radiation passing through the beam path, disturbing intensity fluctuations caused by movement of the external optics, and image disturbances resulting from them, can, however, be avoided.

The invention can advantageously be used for an emitter, for example for target illumination, in which the optics externally image a radiation source, for example a laser. The imaging plane in a situation such as this may be located at infinity. The invention is likewise applicable to detector optics in which, for example, a field of view is imaged on a detector in the missile.

The imaging plane is then located on the detector and forms that end of the beam path which is fixed with respect to the structure. The optical system may be designed for a seeker head of a missile, and the optics may be provided for imaging a field view by means of an imaging beam path onto a detector which is arranged fixed to the structure in the missile, in which case the internal optics may be detector optics. In this case, the shutter is used to mask out a shadow of an element of the missile which is fixed to the structure, on the detector, in an external optics viewing direction which is tilted with respect to the roll axis, or with respect to the missile axis. The roll axis expediently coincides with the missile axis.

The external optics may be a part of the optics directed to the outside, for example in a field of view of the missile or in the direction of a target which is intended to be illuminated. The optics preferably have an optical element which forms the inlet aperture of the optics. This may be a mirror, a lens or some other optical element. The internal optics are expediently that part of the optics which is directed at a detector or a radiation source. The pitch axis is expediently aligned at right angles to the roll axis. That end of the beam path which is fixed with respect to the structure may lie on a detector or a radiation source. The external optics are advantageously mounted in a roll frame, which can rotate about the roll axis relative to an element which is fixed to the structure. Furthermore advantageously, the external optics are mounted in a pitch frame which can rotate about the pitch axis relative to the roll frame, and therefore about the pitch axis and roll axis relative to the element which is fixed to the structure. The element which is fixed to the structure is advantageously arranged such that it cannot move relative to an outer casing of the missile. The terms "fixed to the structure" or "fixed with respect to the structure" or "structurally fixed" are used in the following text for those elements which cannot move relative to the outer casing of the missile. The shadowing element may be an element which is fixed to the structure.

In one advantageous embodiment of the invention, the shutter which is introduced into the beam path is arranged such that it covers the shadow of the element which is fixed to the structure, for example on the detector, in particular on both sides, in particular without moving, during movement of the external optics in an angle range of at least 150° about the pitch axis. This embodiment is based on the idea that a shadow occurs on one side of the image at a high squint angle or pitch angle and, during movement of the external optics through, for example, 180° about the pitch axis, the shadow first of all disappears from the image and then reappears on the other side of the image. During such major movement of the external optics about the pitch axis, a shadow therefore occurs on both sides of the image. In order to avoid having to mechanically move the shutter from one side to the other of the image, it is advantageous for it to be arranged such that it covers both shadows, without moving.

A simple mechanical design for masking out shadows on both sides can be achieved by the external optics being able to be rotated about the pitch axis relative to the shutter. The shutter can thus remain stationary, that is to say fixed to the structure, during rotation of the external optics about the pitch axis. Since the image which is imaged on a detector is also rotated through 90° when the external optics rotate through 90°, for example, about the pitch axis, the shadow occurs on only one side of the detector, although it is on both sides of the image. If the shutter remains stationary during movement of the external optics about the pitch axis, said pitch axis can be arranged such that a shadow on the detector caused by the element which is fixed to the structure is always marked out, independently of the pitch angle, even with the shutter remaining stationary.

Depending on the design of the optics, the image on the detector also rotates when the external optics move only about the roll axis. In order to keep the position of the shutter relative to the imaged image correct for masking out the shadow in all cases, it is advantageous for the shutter to be able to be rotated about the roll axis relative to the element which is fixed to the structure. It can be attached to the roll frame such that it cannot move, and can expediently rotate about the roll axis relative to a detector.

If the shutter can be rotated about the roll axis together with the internal optics, then a mechanically simple design can be achieved.

In order to easily mask out a shadow with relatively little loss of intensity of the radiation on the detector, it is advantageous to be able to introduce the shutter asymmetrically into the beam path, in particular from only one direction.

The shutter is advantageously provided with a straight edge with an edge direction which is introduced as a front edge into the beam path during movement of the shutter into the beam path, with the edge direction being aligned at right angles to the pitch axis in every position of the external optics. This arrangement makes it possible to reliably mask out even a major shadow over up to 50% of the image.

This shutter can advantageously be introduced into the beam path at least so far that 50% of the beam path, and for example an image on a detector, is masked out by the shutter. This makes it possible to reliably mask out the shadow even at a high squint angle of more than 75°, in particular of up to 90°, with respect to the roll axis.

When the missile is flying at high speed, elements which are fixed to the structure are heated and emit infrared radiation which is superimposed on the image of the observed object. By way of example, if the target radiation is in the relatively short wavelength range, then it is advantageous to mask out the long wavelength and disturbing heat radiation. This can be achieved by the shutter having a partially transmissive spectral filter. This allows the target radiation to be retained completely, or at least very largely, while heat radiation from the element which is fixed to the structure and produces the shadow is masked out.

The shutter advantageously has a shutter mount with a plurality of shutters which are in the form of different spectral filters and can be introduced selectively into the beam path. A shutter mount such as this, for example in the form of a filter wheel, makes it possible to react flexibly to different target radiations and disturbance radiations. The spectral filter is expediently selected as a function of a frequency of target radiation.

It is a further object of the invention to provide a method of imaging an object which overcomes a variety of disadvantages of the heretofore-known devices and methods of this general type and which provides for an imaging method, in which high image quality can be achieved even at a high squint angle of the optics.

With this and other objects in view there is also provided, in accordance with the invention, a method of imaging an object by way of a beam path of optics of a missile on an imaging plane, the optics having external optics, rotatably mounted about a roll axis and a pitch axis of the missile, and internal optics, and wherein one end of the beam path is fixed with respect to a structure in the missile. According to the invention, a shutter is selectively introduced into the beam path during flight of the missile to mask out a shadow of a structurally fixed element of the missile in the beam path when the optics assumes a high squint angle. In this case, a "high" squint angle of the optics means an angle of at least 60° with respect to the roll axis or missile axis.

In other words, the above and other objects are achieved by a method of the type mentioned initially in which, according to the invention, a shutter is introduced into the beam path during flight of the missile in order to mask out a shadow of an element, which is fixed to the structure, of the missile in the beam path at a high squint angle of the optics. A disturbing intensity fluctuation of radiation striking a detector, and an image disturbance associated with this, can be avoided.

In one advantageous refinement of the invention, the flight time from the start of a flight to a target being aimed at is calculated, and the introduction of the shutter after at least 25% of the calculated flight time, in particular at least 30% of the calculated flight time, to the target being aimed at is controlled with the aid of a timer has elapsed. This embodiment is based on the idea that, as the missile continuously approaches the object, its radiation, that is to say the target radiation, increases in accordance with the square of the range. Thus approximately twice the target radiation strikes the inlet aperture or the external optics at 70% of the original range to the object. When the shutter is introduced, for example with 50% of the incident radiation being masked out, the same signal as at the start of flight therefore falls on the detector. From this time, that is to say after 25 or 30% of the flight time has elapsed, it is then advantageous for the inlet aperture to be kept constant by the shutter.

In accordance with an advantageous embodiment, an intensity of radiation striking a detector is monitored during flight, and the shutter is introduced if the fluctuation of the intensity over time is more than a predefined limit value. The fluctuation is expediently an absolute fluctuation. The fluctuating intensity is an indication of changing shadowing or changes in the image caused by thermal radiation from radiating elements which are fixed to the structure. The introduction of the shutter into the beam path makes it possible to reduce the intensity fluctuation, and to improve the image quality.

A further variant of the invention provides that a squint angle of the external optics is monitored during flight, and the shutter is introduced as a function of the profile of the squint angle over time. If, for example, the object being aimed at is still at long range, then the squint angle is generally low when the missile approaches in the direction of the object. There is no need to introduce the shutter. The closer the missile comes to the object, the greater the squint angle can become. An advantageous time for introduction of the shutter into the beam path can be determined by monitoring the squint angle. For example, when the squint angle for the first time becomes more than nx during the flight or within a defined time, where n is a fixed number, or becomes more than a limit value within a defined time, which is longer than another defined time, then the introduction of the shutter into the beam path can be controlled.

The shutter is expediently configured to mask out at least 30%, and in particular up to 50%, of the incident radiation. The shutter is advantageously suitable for masking out at least half of the beam path in the area of the shutter, from one side.

Other features which are considered as characteristic for the invention are set forth in the appended claims.

Although the invention is illustrated and described herein as embodied in an optical system for a missile, and method for imaging an object, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
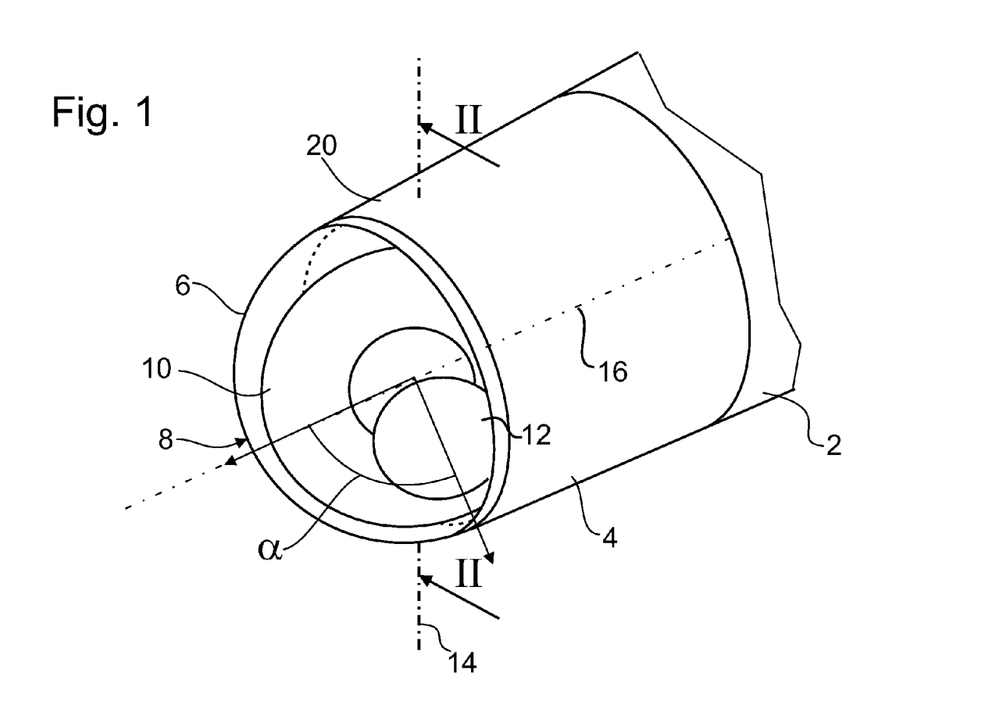
FIG. 1 is a perspective view of a nose of a missile with a seeker head.

Referring now to the figures of the drawing in detail and first, particularly, to FIG. 1 thereof, there is shown a nose of a missile 2, for example a guided missile for attacking airborne targets. The nose carries a seeker head 4. At its front end, the seeker head 4 is fitted with a dome 6 through which infrared radiation can pass, for example composed of sapphire, with a spherical surface and an opening angle, also referred to as the dome angle, of just about 180°. External optics 8, which are used as input optics for an imaging beam path, can be seen with two mirrors 10, 12 in the interior of the dome 6, which mirrors 10, 12 are arranged rigidly with respect to one another but can rotate together about a pitch axis 14 and a roll axis 16 of the seeker head 4. The roll axis 16 runs parallel to a missile axis of the missile 2.

Figure 2:
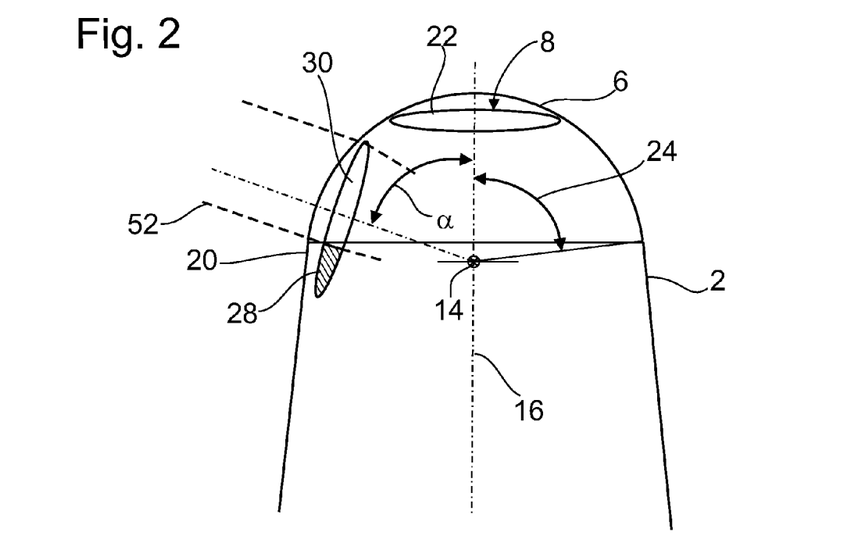
FIG. 2 is a diagrammatic side view of the missile nose of FIG. 1.

In the example illustrated in FIG. 1, the external optics 8 which, together with the mirror 10, form the inlet aperture of optics 18 which are illustrated in FIG. 2, are deflected with a pitch angle or squint angle α of around 70° with respect to the missile axis or roll axis 16. A part of the inlet aperture is therefore shadowed by an element 20 which is fixed to the structure, in this case a metallic mount for the dome 6, which at the same time forms an outer casing of the missile 2 or seeker head 4. The external optics 8 may in a different exemplary embodiment be in the form of lens optics, in which a lens or some other optical element is used instead of the mirror 10 which forms the inlet aperture.

The angles of the external optics 8 are illustrated in the schematic view in FIG. 2. The external optics 8 are represented as a lens, which forms the inlet aperture 22. The dome 6 forms a dome angle 24 of about 84°, as a result of which half of the external optics 8, which are tilted through the squint angle α or pitch angle of 84° about the pitch axis 14 relative to the roll axis 16, is shadowed by the element 20. The inlet aperture 22 and therefore the beam path are therefore half-shadowed. It is likewise feasible for the optics 8 to be designed such that a half shadow does not occur until a squint angle α of 90°.

In the example illustrated in FIG. 2, the external optics 8 have been tilted through about 70° with respect to the missile axis or roll axis 16, as a result of which the shadow 28 is approximately 25%, and the shadowed aperture 80 is approximately 75% of the inlet aperture 22.

Figure 3:
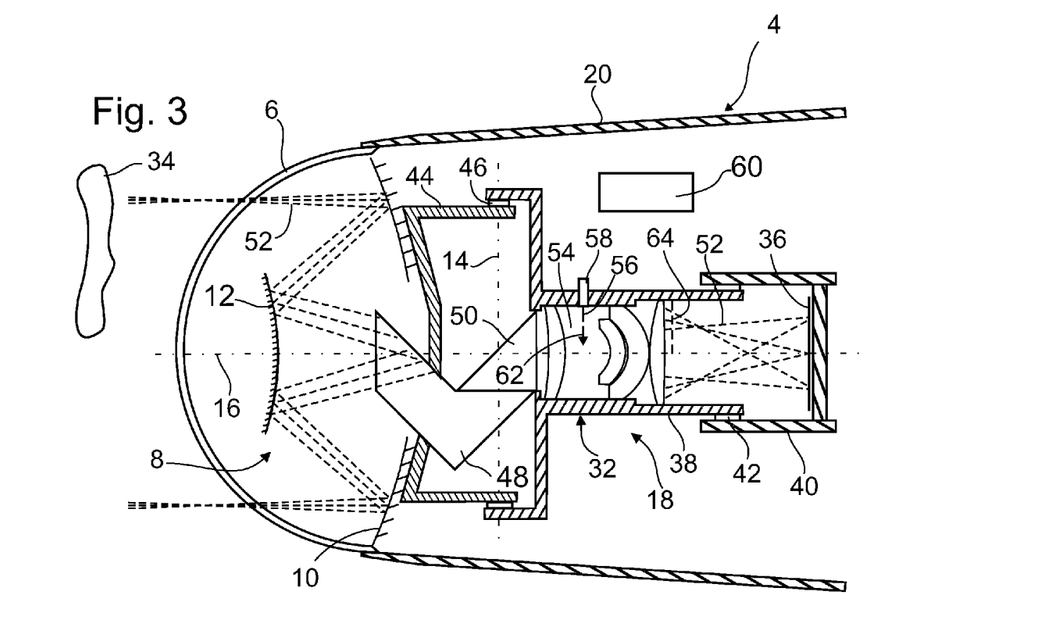
FIG. 3 is a longitudinal section taken through the missile nose and illustrating the seeking head and also showing an object in front of the missile.

FIG. 3 shows a schematic section illustration through the seeker head 4 of the missile 2. The seeker head 4 has optics 18 with the external optics 8, which comprise the mirrors 10, 12 and detector optics 32, which form the internal optics. The detector optics 32 comprise an arrangement of lenses for imaging an object 34 on a detector 36. The detector 36 is arranged fixed to the structure in the seeker head 4, that is to say it is mounted such that it cannot move relative to the outer skin 20 of the seeker head 4. The detector optics 32 are incorporated in a roll frame 38 which is mounted such that it can move by means of bearings 42 and can be rotated about the roll axis 16 relative to elements 40 which are fixed to the structure. A pitch frame 44 is once again held in bearings 46 such that it can move relative to the roll frame 38 and, in addition to the capability to rotate about the roll axis 16, can also rotate about the pitch axis 14. This ensures that the external optics 8 can move in two dimensions within a hemispherical angle range. Radiation received by the external optics 8 is passed through prisms 48, 50 to the detector optics 32, with the prism 50 being mounted in the roll frame 38 and the prism 48 being mounted in the pitch frame 44. An intermediate image plane is located in the beam path 52 of the optics 18 between the mutually facing boundary surfaces of the prisms 48, 50, that is to say where they can move relative to one another. Mirrors can be used instead of the prisms 48, 50.

The detector optics 32 have a zone 54 in which the beams of the beam path 42 run virtually parallel, although is not illustrated in FIG. 2, for the sake of clarity. A shutter 56 is arranged in this zone 54 and can be introduced into the beam path 52 of the optics 18 in the direction of the illustrated arrow 62 by means of a drive 58—controlled by a control means 60. Instead of the shutter 56 being arranged within the detector optics 32, it is also possible to arrange it between the detector optics 32 and the detector 36, for example as is represented by the dashed line 64.

The shutter 56 can be moved into the beam path 52 and out of it again by the control unit 60 during the flight of the missile 2, wherein the control means 60 are prepared with the aid of software for moving the shutter 56 into the beam path 52 as a function of a predetermined parameter. In order to make it possible to completely mask out a shadow of the inlet aperture 22 at a squint angle α of at least 84°, the shutter 56 can be introduced as far as the centre of the beam path 52, such that half of the cross-sectional area of the beam path 52 is marked out by the shutter 56 at the location of the shutter 56. In addition, undesirable backward radiation from the optics 18 in the direction of the object 34 can be prevented in this way. The extent to which the control means 60 move the shutter 56 into the beam path 52 can likewise be made dependent on a parameter, for example on a profile of the squint angle over time.

Figure 4:
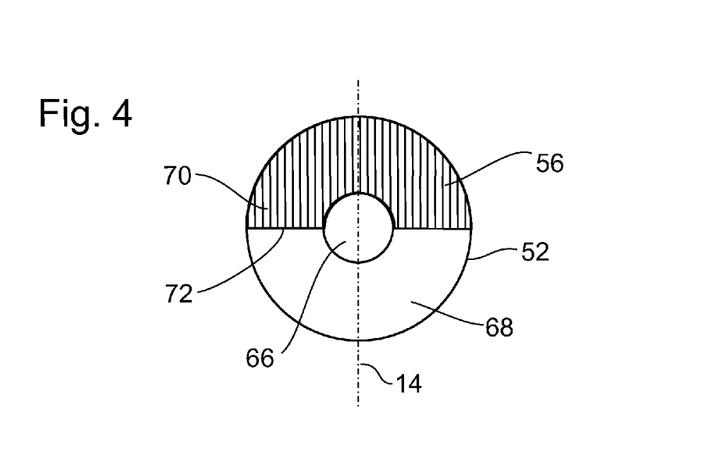
FIG. 4 is a cross-section through the beam path taken at the location of the shutter.

FIG. 4 shows a cross section through the beam path 52 at the location of the shutter 56. A centre section 66 of the beam path 52 remains free of radiation, because of the shadow by the mirror 12. In a passing area 68, radiation is passed through from the external optics 8 to the detector 36, while, in a shutter area 70, the radiation in the beam path 52 is masked out by the shutter 56. The centre section 66 can, of course, also be partially covered by the shutter 56. The shutter 56 is arranged in the beam path 52 such that a front edge 72, which faces into the beam path 52, runs at right angles to the pitch axis 14. In particular, the front edge 72 is arranged at right angles to both the pitch axis 14 and the roll axis 16. From the view in FIG. 3, the front edge 72 therefore runs at right angles to the plane of the paper.

Figure 5:
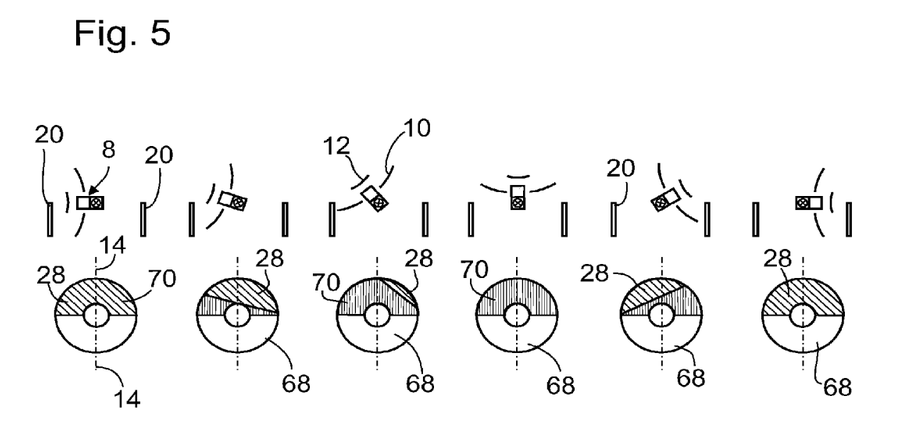
FIG. 5 shows an image sequence relating to different positions of external optics of the seeker head, and relating to images resulting therefrom on a detector.

Six small graphics in FIG. 5 show the profile of a shadow 28 caused by the element 20, which is fixed to the structure, during a pivoting movement of the external optics 8 through 180° about the pitch axis 14. In the first, left-hand graphic, the external optics 8 and, with them, the inlet aperture, has been pivoted through 90° with respect to the roll axis 16 caused by the squint angle α of 90°. Half of the beam path 52 is therefore shadowed in coincidence with the area of the shutter 56 by the element 20 which is fixed to the structure, and the shadow 28 is therefore half of the cross section of the beam path 52 at the location of the shutter 56. In the second graphic, the squint angle α is about 70°. The shadow 28 is therefore reduced somewhat, as is illustrated in the lower part of the second graphic. In this graphic, the shutter 56 and its shutter area 70 can also be seen, and it is clear that the shutter area 70 masks out the entire half-side shadow 28 that is shown in the first, left graphic. The passing area 68 is therefore always 50% of the beam path 52, irrespective of the size of the shadow 28. The third graphic illustrates a squint angle α of 45°, and the shadow 28 is now only very small. There is no shadow with a squint angle α of 0°, as is shown in the fourth graphic, while, in contrast, a squint angle α in the other direction, as is illustrated in the graphics 5 and 6, once again leads to a shadow 28. However, as can be seen, the passing area 68 remains unchanged throughout the entire profile of the pivoting movement of the external optics 8 through 180° about the pitch axis 14.

As can also be seen from FIG. 5, the shadow 28, caused by the element 20 which is fixed to the structure, rotates with the squint angle α during rotation of the inlet aperture 22 about the pitch axis 14 in the area of the shutter 56, and also onto the detector 36. During a pitching movement of 90°, for example, an image of the object 34 therefore rotates on the detector 36, and the shadow 28 also rotates through the same angle in the area of the shutter 56. In consequence, in the illustration shown in FIG. 5, the shadow 28 moves continuously from top to bottom into the beam path 52 as the squint angle α increases, irrespective of whether the inlet aperture 22 is pivoted to the right or left. As a result of the arrangement of the shutter 56, it therefore always masks out all of the shadow 28, at all squint angles α, in each direction, and without having to be moved itself. During rotation of the external optics 8 about the roll axis 16, both the shadow 28 and the shutter 56 rotate to the same extent, as a result of which the shutter 56 always masks out the shadow 28, irrespective of the position of the external optics 8, as a result of which the passing area 68 and therefore the radiation intensity on the detector 36 remain constant.

Figure 6:
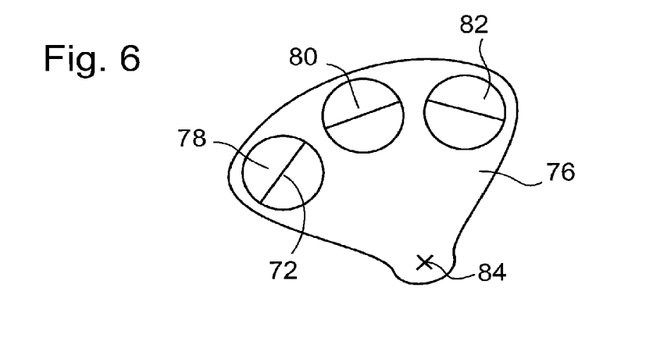
FIG. 6 shows a filter wheel with 3 spectrally filtering shutters.

FIG. 6 shows a shutter wheel 76 with three shutters 78, 80, 82, which each comprise different spectral filters. In this way, by way of example, only one long wave, one long and medium wave, or only one short wave spectral range can be filtered out, for example as a function of identified target radiation. The shutter wheel 76 can be rotated about a rotation axis 84, for example by the drive 58, such that one of the shutters 78, 80, 82 can be introduced freely selectably into the beam path 52. The front edges 72 of the shutters 78, 80, 82 are in this case always aligned in the same direction in the beam path 52, specifically at right angles to the pitch axis 14 and roll axis 16.

Figure 7:
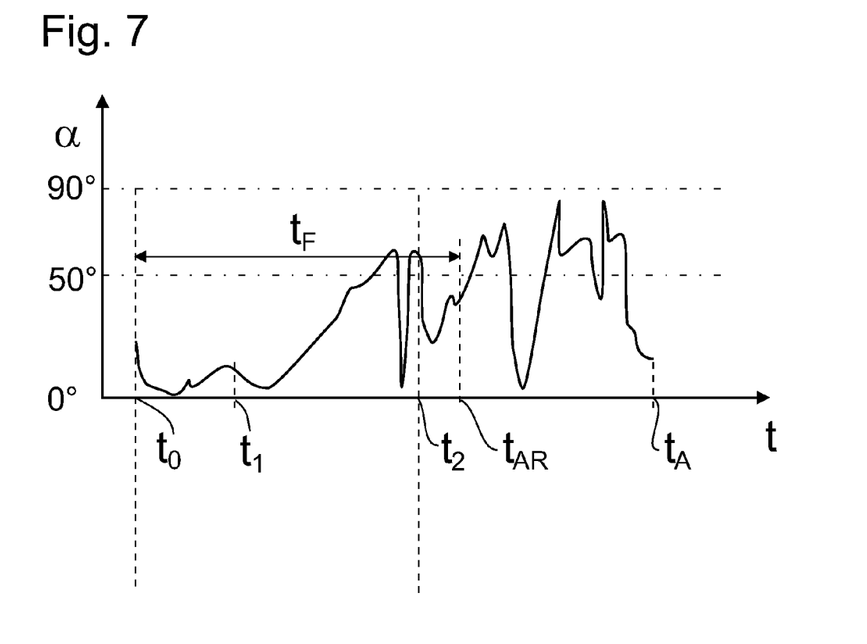
FIG. 7 shows a diagram of the squint angle α of the external optics plotted against time.

FIG. 7 shows a profile of the squint angle α of the inlet aperture 22 and external optics 8 over the course of time t. By way of example, the missile 2 is launched from an aircraft in the direction of a target, or the object 34, at the time $t_0$. In this case, the external optics 8 have already been aligned with the target, as a result of which the squint angle α is not equal to zero and, in the example in FIG. 7, is about 20°. During the course of the flight of the missile 2 in the direction of the target, the squint angle α varies until the missile 2 strikes its target, with the fluctuation in the squint angle α increasing as the range to the target decreases, for example as a result of flight maneuvers of the target.

There are now various possible ways to control the movement of the shutter 56 into the beam path 52. One option is time control. In this case, a flight time $t_F$ is calculated from the starting time $t_0$ to a calculated impact time $t_{AR}$. After 30% of the approach, that is to say after completion of about 30% of the flight time $t_F$, the target radiation has, by calculation, reached twice the intensity of that at the starting time $t_0$, as a result of the square-law profile of the target radiation with respect to range. As a result of the coverage of half the beam path 52 by the completely introduced shutter 56, sufficient target radiation therefore remains available to allow continued reliable tracking of the target. A first shutter time $t_1$, which occurs at 30%—or some other value—of the flight time $t_F$ can thus be determined from the flight time $t_F$ and the starting time $t_0$. At this shutter time $t_1$, the introduction of the shutter 56 into the beam path 52 is controlled by the control means 60.

The calculated impact time $t_{AR}$ need not in this case coincide with the actual impact time $t_A$, since this is unknown and may occur considerably after the calculated impact time $t_{AR}$, because of target flight manoeuvres. However, this has no adverse effect on the introduction of the shutter 56, since the first approach phase of the missile 2 to the target has an essentially linear profile during the first 30% of the calculated flight time $t_F$, and flight manoeuvres and other disturbances do not become evident until the missile approaches closer to the target.

A further option is to monitor the squint angle α over time, and to control the shutter time $t_2$ as a function of the profile of the squint angle α. In the example shown in FIG. 7, a shadow does not occur until a squint angle α of more than 50°. As soon as this squint angle α is reached, the shutter 56 can be moved into the beam path 52, but expediently not until at least 30% of the flight time $t_F$ has elapsed, in order to reliably avoid loss of the target. In the example shown in FIG. 7, the shutter time $t_2$ at which the shutter 56 is moved into the beam path 52 is determined from the time for which the squint angle α has been above 50°—or some other squint angle limit value—within a predetermined time interval, for example of 10 seconds. This predetermined time period is exceeded at the time $t_2$, and the shutter 56 is moved in. The shutter 56 remains in the beam path 52 from this time $t_2$, in the same way as from the previously described time $t_1$ as well, irrespective of how the squint angle α continues to behave.

Figure 8:
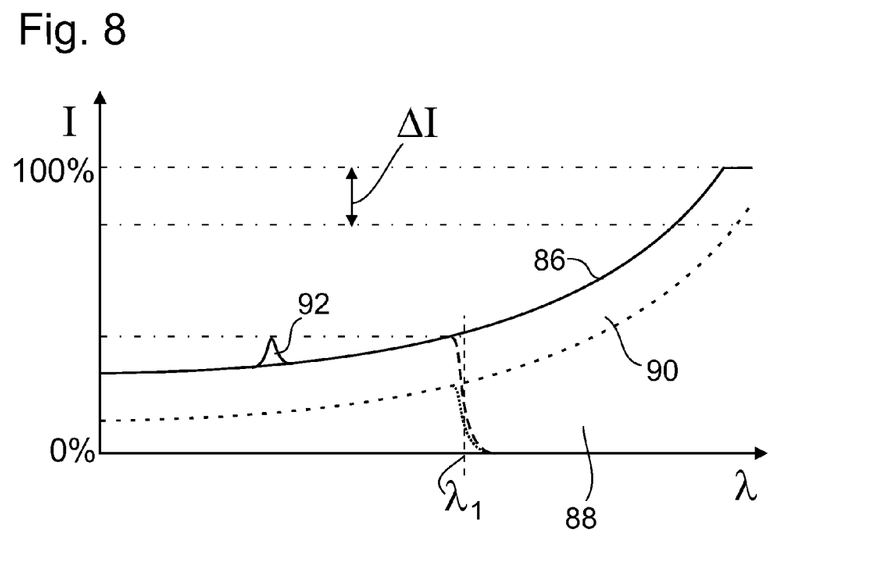
FIG. 8 shows a schematic diagram of the intensity of radiation striking the detector, as a function of its wavelength.

A further option for controlling the shutter time is indicated in FIG. 8. The illustration shows a highly smooth profile of the radiation 86 striking the detector 36 as a function of the wavelength λ of this radiation. The radiation 86 comprises, for example, a component of structure radiation 88, which is emitted from the highly heated dome 6 and other elements 20 of the missile 2, and whose intensity rises as the wavelength increases. A component of background radiation 90, which for the sake of simplicity is assumed to be constant over the wavelength, is added to this structure radiation 88, as a result of which the radiation 86 is formed from the sum of the structure radiation 88 and the background radiation 90. In addition, there is a very small component of target radiation 92 in a relatively narrow spectral interval with respect to the radiation 86. During severe pitching movements of the external optics 8, the structure radiation 88 fluctuates very greatly, as a result of which the radiation 86 can very quickly saturate the detector 36, as is illustrated as 100% in FIG. 8. If a major fluctuation in the radiation 86 is found, for example through a radiation fluctuation Δl above a limit value of, for example 25% of the detector saturation radiation, in which case the radiation fluctuation Δl may be used over the entire flight time so far or over some other time interval, then the shutter 56 is moved into the beam path 52. In the example shown in FIG. 8, it is expedient to move in the shutter 78, which is in the form a spectral filter for filtering long-wave infrared radiation. This reduces the radiation 86, as indicated by dashed lines around the limit wavelength $\lambda_1$ from which the spectral filter in the shutter 78 carries out filtering. This greatly reduces fluctuation of the structure radiation 88 and therefore of the total radiation 86, thus reducing image errors.

The above description and the associated illustration pertain to exemplary embodiments of the invention. The following claims contain numerous features in combination, which a person skilled in the art will expediently also consider individually, and will combine to form worthwhile further combinations.

The invention claimed is:

1. An optical system for a missile, comprising:
   optics for imaging an object by way of a beam path on an imaging plane;
   said optics including external optics rotatably mounted about a roll axis and a pitch axis of the missile, and internal optics, and wherein one end of the beam path is structurally fixed with respect to the missile;
   a shutter disposed for introduction into the beam path during a flight of the missile, in order to mask out a shadow, which is produced by an element of the missile in the beam path when a viewing direction of said external optics is tilted with respect to the roll axis of the missile.

2. The optical system according to claim 1, wherein said shutter to be introduced into the beam path is disposed to cover the shadow of the element that is fixed to the structure during a movement of said external optics in an angle range of at least 150° about the pitch axis.

3. The optical system according to claim 1, wherein said external optics is rotatably mounted about the pitch axis relative to said shutter.

4. The optical system according to claim 1, wherein said shutter is supported for rotation about the roll axis.

5. The optical system according to claim 4, wherein said shutter is supported for rotation about the roll axis together with said internal optics.

6. The optical system according to claim 1, wherein said shutter can be introduced asymmetrically into the beam path.

7. The optical system according to claim 1, wherein said shutter is formed with a straight edge having an edge direction introduced as a front edge into the beam path during movement of said shutter into the beam path, the edge direction being aligned perpendicular to the pitch axis in every position of said external optics.

8. The optical system according to claim 1, wherein said shutter has a partially transmissive spectral filter.

9. The optical system according to claim 1, wherein said shutter has a shutter mount with a plurality of shutter elements formed as mutually different spectral filters and selectively introducible into the beam path.

10. The optical system according to claim 9, wherein a respective spectral filter is selected as a function of a frequency of target radiation.

11. A method of imaging an object by way of a beam path of optics of a missile on an imaging plane, which comprises:
   providing optics including external optics, rotatably mounted about a roll axis and a pitch axis of the missile, and internal optics, and having one end of the beam path fixed with respect to a structure in the missile;
   selectively introducing a shutter into the beam path during flight of the missile to mask out a shadow of a structurally fixed element of the missile in the beam path when the optics assumes a high squint angle.

12. The method according to claim 11, which comprises calculating a flight time to a target being aimed at, and controlling an introduction of the shutter with the aid of a timer after at least 25% of the calculated flight time to the target has elapsed.

13. The method according to claim 11, which comprises monitoring an intensity of radiation striking a detector during flight, and introducing the shutter if a fluctuation of the intensity over time is more than a predefined limit value.

14. The method according to claim 11, which comprises monitoring the squint angle of the external optics during flight, and introducing the shutter as a function of a profile of the squint angle over time.

* * * * *